United States Patent
Koga

(10) Patent No.: US 11,194,307 B2
(45) Date of Patent: Dec. 7, 2021

(54) CONTROLLER AND CONTROL SYSTEM FOR EXECUTION OF A CALLBACK OPERATION FOR AN INDUSTRIAL MACHINE

(71) Applicant: FANUC CORPORATION, Yamanashi (JP)

(72) Inventor: Daijirou Koga, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 16/259,183

(22) Filed: Jan. 28, 2019

(65) Prior Publication Data

US 2019/0258219 A1    Aug. 22, 2019

(30) Foreign Application Priority Data

Feb. 16, 2018    (JP) .............................. JP2018-026273

(51) Int. Cl.
    *G05B 19/406*    (2006.01)
    *B23Q 15/007*    (2006.01)

(52) U.S. Cl.
    CPC ......... *G05B 19/406* (2013.01); *B23Q 15/007* (2013.01); *G05B 2219/30* (2013.01)

(58) Field of Classification Search
    CPC . G05B 19/406; G05B 2219/30; B23Q 15/007
    USPC ....................................................... 700/177
    See application file for complete search history.

(56) References Cited

U.S. PATENT DOCUMENTS

2015/0331678 A1* 11/2015 Sakamoto ............... G06F 9/448
                                                          717/146
2018/0348728 A1* 12/2018 Ota ...................... G05B 19/058

FOREIGN PATENT DOCUMENTS

| CN | 108983710 | 12/2018 |
| JP | 8-190476 | 7/1996 |
| JP | H 10289011 A | * 10/1998 |
| JP | H 11327885 A | * 11/1999 |
| JP | WO2004/061537 | 7/2004 |

OTHER PUBLICATIONS

Notification of Reasons for Refusal dated Jan. 28, 2020 in Japanese Patent Application No. 2018-026273.
Office Action dated Nov. 2, 2020 in CN Patent Application No. 201910111297.1.

* cited by examiner

*Primary Examiner* — Jigneshkumar C Patel
(74) *Attorney, Agent, or Firm* — Wenderoth, Lind & Ponack, L.L.P.

(57) ABSTRACT

A controller capable of preventing human mistakes by customizing checking contents upon operations of users to automatically perform customized checking appropriately is provided. A controller that controls an industrial machine includes: a receiving unit that receives a condition of a callback process associated with control of the industrial machine and an action corresponding to the condition; and a designated condition registering unit that registers the condition and the action received by the receiving unit as a callback process.

8 Claims, 5 Drawing Sheets

FIG. 2

```
On_ToolOfsChange( num_ofs, ofs ):
if( (tool_ofs[num_ofs]-0.1) <= ofs <= (tool_ofs[num_ofs]+0.1) ){
    return 0;
}else{
    alart( "INPUT VALUE IS DIFFERENT BY 0.1 MM OR MORE FROM PREVIOUS VALUE; IS IT OKAY WITH THIS VALUE? ISN'T THERE A PIECE OF GARBAGE PRESENT?" );
    return 1;
}

On_WorkOfsChange( num_ofs, axis_ix, ofs, dp ):
if( 0.001*tool_ofs[num_ofs] <= ofs <= 1000*tool_ofs[num_ofs] ){
    return 0;
}else{
    alart( "INPUT VALUE IS DIFFERENT BY 1000 TIMES OR MORE FROM PREVIOUS VALUE; IS IT OKAY WITH THIS VALUE? DIDN'T YOU FORGET TO INPUT A DECIMAL POINT?" );
    return 1;
}

On_SimulationExecution( num_o ):
sim_exec[num_o] = 1;   // SET FLAG INDICATING THAT SIMULATION WAS PERFORMED FOR RESPECTIVE PROGRAM NUMBERS On_ProgramExecution( num_o ):
if( sim_exec[num_o] == 0 ){   // IN CASE OF PROGRAMS FOR WHICH SIMULATION WAS NOT EXECUTED
    alart( "SIMULATION WAS NOT EXECUTED FOR THIS PROGRAM; IT IS OKAY TO EXECUTE THIS PROGRAM?" );
    return 1;
}
return 0;
```

CONTROLLER AND CONTROL SYSTEM FOR EXECUTION OF A CALLBACK OPERATION FOR AN INDUSTRIAL MACHINE

This application is based on and claims the benefit of priority from Japanese Patent Application No. 2018-026273, filed on 16 Feb. 2018, the content of which is incorporated herein by reference.

BACKGROUND OF THE INVENTION

Field of the Invention

The present invention relates to a controller and a control system.

Related Art

Conventionally, machining failures resulting from operation mistakes of users occur in a machining site where CNC machine tools are used.

Examples of operation mistakes of users include an input mistake of a tool length compensation amount, an input mistake of the origin of a work coordinate system, and a mistake that a program is executed without checking motion by simulation.

A specific example of an input mistake of a tool length compensation amount is a case in which, although an operator has input a measurement result of a tool length compensation amount, since a piece of garbage was disposed between measuring points during the measurement, a value larger than the actual value is input.

A specific example of an input mistake of the origin of a work coordinate system is a case in which, although a coordinate value is input from a screen when an operator sets the origin of a work coordinate system, since the operator inputs a decimal point which is not necessary in actuality or does not input a decimal point which is necessary in actuality when inputting the coordinate value, the coordinate value of the origin is set different from the actual coordinate and a machining failure or destruction of a machine occurs.

A specific example of a mistake that a program is executed without checking motion by simulation is a case in which since an operator has performed actual machining without checking motion by simulation, a machining failure occurs without noticing an error in the program.

Although these mistakes are prevented by countermeasures in management that cause users to pay attention and that formulate the rules of operation orders, users may make mistakes even if users pay attention.

Moreover, users may ignore the rules intentionally or forget the rules.

Due to these reasons, it is difficult to prevent human mistakes completely.

In this regard, Patent Document 1 discloses a numerical controller that displays warning messages of different types depending on an input mistake when an operator inputs machining program data from an input unit.

Patent Document 1: Republished International Patent Publication No. WO2004/061537

SUMMARY OF THE INVENTION

However, when users' operations are checked mechanically to prevent operation mistakes mechanically, since the content to be checked is different depending on circumstances of machines and sites, it is desirable that the checking content can be customized so as to reflect these circumstances.

An object of the present invention is to provide a controller capable of preventing human mistakes by customizing checking contents upon operations of users to automatically perform customized checking appropriately.

(1) A controller (for example, a controller 1 to be described later) of the present invention is a controller that controls an industrial machine, including: a receiving unit (for example, a receiving unit 11 to be described later) that receives a condition of a callback process associated with control of the industrial machine and an action corresponding to the condition; and a designated condition registering unit (for example, a designated condition registering unit 123 to be described later) that registers the condition and the action received by the receiving unit as a callback process.

(2) In the controller (for example, a controller 1 to be described later) according to (1), the condition may include any one or more among identifiers corresponding to various operations of a user in the industrial machine, a machine coordinate value, a tool length compensation amount, a tool wear compensation amount, a work coordinate system offset, a workpiece setting error compensation amount, input signals from a control board for operating the industrial machine, input signals from sensors attached to the industrial machine, operation information of an MDI key or a soft key of the industrial machine, transmission/reception information of communication signals, parameters, macro variables, and system variables used for controlling the industrial machine, and diagnosis information of the industrial machine.

(3) In the controller (for example, a controller 1 to be described later) according to (1) or (2), the action may include one or more among permission of execution of an operation from a user, rejection of execution of an operation from a user, application of changes in setting values of the controller, cancellation of changes in setting values of the controller, displaying of messages, issuing of alarms, transmission/reception of control signals, and transmission/reception of communication signals.

(4) The controller (for example, a controller 1 to be described later) according to any one of (1) to (3) may further include: an operation receiving unit (for example, an operation receiving unit 131 to be described later) that receives execution of an operation by a user on the controller; and a designated condition execution unit (for example, a designated condition execution unit 132 to be described later) that executes the callback process corresponding to the operation.

(5) A control system (for example, a control system 10 to be described later) of the present invention is a control system including: a callback setting device (for example, a callback setting device 1A to be described later); and one or more industrial machines (for example, a machine tool 2 to be described later) communicably connected to the callback setting device via a network (for example, a network 3 to be described later), the callback setting device includes: a receiving unit (for example, a receiving unit 11 to be described later) that receives a condition of a callback process associated with control of the industrial machine and an action corresponding to the condition; and a designated condition registering unit (for example, a designated condition registering unit 123 to be described later) that registers the condition and the action received by the receiving unit as a callback process, the industrial machine includes: a designated condition receiving unit (for example, a designated condition receiving unit 23 to be described later) that receive a content of the callback process registered by the callback setting device and a numerical control unit (for example, a numerical control unit 24 to be described later), and the numerical control unit includes: an operation receiving unit (for example, an operation receiving unit 131 to be described later) that receives execution of an operation by the user on the industrial machine; and a designated condition execution unit (for example, a designated condition execution unit 132 to be described later) that executes the callback process corresponding to the operation.

(6) In the control system (for example, a control system 10 to be described later) according to (5), the numerical control unit (for example, a numerical control unit 24 to be described later) may be separated from the industrial machine (for example, a machine tool 2 to be described later).

(7) In the control system (for example, a control system 10 to be described later) according to (5) or (6), the designated condition receiving unit (for example, a designated condition receiving unit 23 to be described later) may be separated from the industrial machine (for example, a machine tool 2 to be described later).

(8) In the control system (for example, a control system 10 to be described later) according to any one of (5) to (7), the designated condition receiving unit (for example, a designated condition receiving unit 23 to be described later) may be included in the numerical control unit (for example, a numerical control unit 24 to be described later).

(9) A control system (for example, a control system 10 to be described later) of the present invention is a control system including: a callback setting device (for example, a callback setting device 1A to be described later); and one or more industrial machines (for example, a machine tool 2 to be described later) communicably connected directly to the callback setting device, the callback setting device includes: a receiving unit (for example, a receiving unit 11 to be described later) that receives a condition of a callback process associated with control of the industrial machine and an action corresponding to the condition; and a designated condition registering unit (for example, a designated condition registering unit 123 to be described later) that registers the condition and the action received by the receiving unit as a callback process, and the industrial machine includes: an operation receiving unit (for example, an operation receiving unit 131 to be described later) that receives execution of an operation by the user on the industrial machine; and a designated condition execution unit (for example, a designated condition execution unit 132 to be described later) that executes the callback process corresponding to the operation.

According to the present invention, it is possible to provide a controller capable of preventing human mistakes by customizing checking contents upon operations of users to automatically perform customized checking appropriately.

BRIEF DESCRIPTION OF THE DRAWINGS

FIG. 2 is a diagram illustrating an example of a script input from a condition designating unit included in the controller according to the first embodiment of the present invention.

DETAILED DESCRIPTION OF THE INVENTION

First Embodiment

Figure 1:
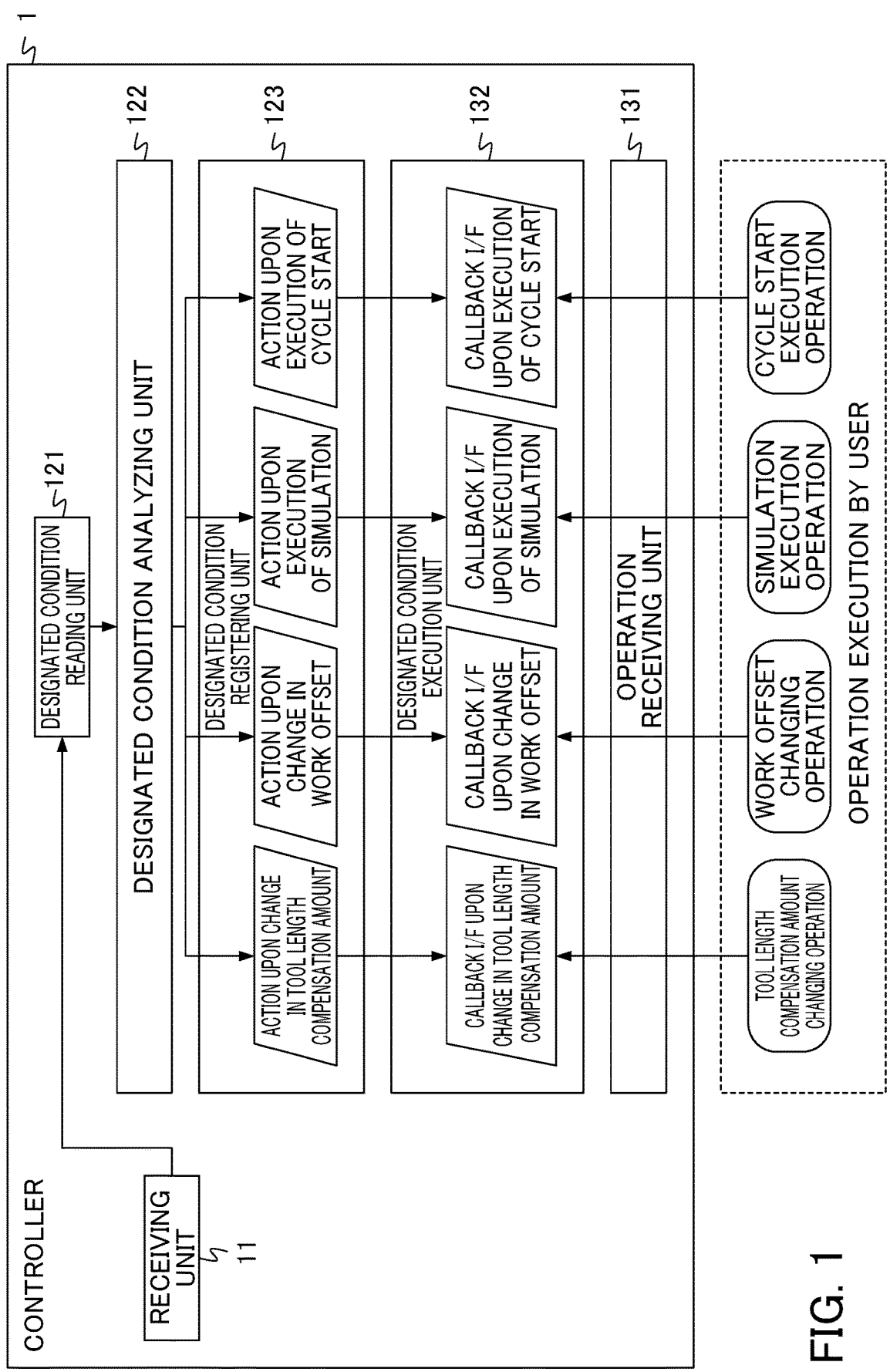
FIG. 1 is a functional block diagram of a controller according to a first embodiment of the present invention.

Hereinafter, a first embodiment of the present invention will be described in detail with reference to FIGS. 1 to 3. FIG. 1 is a functional block diagram of a controller 1 according to the first embodiment of the present invention. The controller 1 includes a receiving unit 11, a designated condition reading unit 121, a designated condition analyzing unit 122, a designated condition registering unit 123, an operation receiving unit 131, and a designated condition execution unit 132.

More specifically, the controller 1 includes a control unit (not shown) that controls the entire controller 1. The controller 1 reads various programs appropriately from a storage area such as a ROM, a RAM, a flash memory, or a hard disk (HDD) and executes the programs. In this way, various functions of the receiving unit 11, the designated condition reading unit 121, the designated condition analyzing unit 122, the designated condition registering unit 123, the operation receiving unit 131, and the designated condition execution unit 132 are realized.

The control unit may be a CPU, for example.

In the functional block diagram of FIG. 1, rectangular blocks indicate functional blocks, parallelogrammic blocks indicate data, and rounded rectangular blocks indicate operations of a user.

The controller 1 is a device for controlling an industrial machine, and may be a numerical controller for controlling a machine tool, for example, or a robot controller for controlling a robot.

The receiving unit 11 receives a condition of a callback process associated with control of an industrial machine and an action corresponding to this condition.

More specifically, a user inputs conditions and actions for defining the content of a callback process with the aid of the receiving unit 11.

The user may input conditions and actions by describing such a script as described later and may input conditions and actions by operating via a GUI.

The receiving unit 11 may be separated from the controller 1.

FIG. 2 illustrates an example of a script when a user inputs the conditions and actions by describing a script. The script in FIG. 2 includes four identifiers "On_ToolOfsChange", "On_WorkOfsChange", "On_SimulationExecution", and "On_ProgramExecution" corresponding to the operations of the user.

The identifier "On_ToolOfsChange" indicates that the following commands are conditional determination and actions that are to be performed once a user changes a tool offset. In the example of FIG. 2, an action of "displaying a warning message" is executed on an additional condition that "the present input value is different by 0.1 mm or more from the previous input value" in addition to a first condition that "a user has changed a tool offset".

The identifier "On_WorkOfsChange" indicates that the following commands are conditional determination and actions that are to be performed once a user changes a work offset. In the example of FIG. 2, an action of "displaying a warning message" is executed on an additional condition that "the present input value is different 1000 times or more from the previous input value" in addition to a first condition that "a user has changed a work offset".

The identifier "On_SimulationExecution" indicates that the following commands are conditional determination and actions that are to be executed once a user executes simulations for respective program numbers.

In the example of FIG. 2, an action of "setting flags of respective program numbers to 1" is executed on only one condition that "simulation was executed" without using any additional condition.

The identifier "On_ProgramExecution" indicates that the following commands are conditional determination and actions that are to be executed once a user executes programs of respective program numbers.

In the example of FIG. 2, an action of "displaying a warning message" is executed on an additional condition that "the value of the flag of a respective program number set by the processing of "On_SimulationExecution" is 0" in addition to a first condition that "a user has executed a program".

An element that forms a condition may include any one or more among identifiers corresponding to various operations of the user in an industrial machine, a machine coordinate value, a tool length compensation amount, a tool wear compensation amount, a work coordinate system offset, a workpiece setting error compensation amount, input signals from an operation board for operating the industrial machine, input signals from sensors attached to the industrial machine, operation information of an MDI key or a soft key of the industrial machine, transmission/reception information of communication signals, parameters, macro variables, and system variables used for controlling the industrial machine, and diagnosis information of the industrial machine.

An action performed during callback when conditions are satisfied may include one or more among permission of execution of an operation from a user, rejection of execution of an operation from a user, application of changes in setting values of the controller, cancellation of changes in setting values of the controller, displaying of messages, issuing of alarms, transmission/reception of control signals, and transmission/reception of communication signals.

The receiving unit 11 stores data of conditions and actions input by the user in a storage device (not shown).

The designated condition reading unit 121 reads the conditions and actions (both will be collectively referred to as "designated conditions") received by the receiving unit 11. More specifically, the designated condition reading unit 121 reads data including the conditions and actions stored in the storage device (not shown) via a bus or an input/output circuit.

The designated condition analyzing unit 122 analyzes the data including the conditions and actions read by the designated condition reading unit 121.

Specifically, first, recursive descent parsing or the like is performed on the basis of a predetermined syntax definition, for example, to generate a syntax tree from a script.

The syntax tree may be generated in such a form that additional condition nodes and action nodes hang under nodes indicating the identifiers corresponding to various operations of the user by defining the syntax appropriately. By this analysis, it is possible to extract conditional determination and actions corresponding to various operations of the user from the syntax tree generated in a desired form.

The designated condition registering unit 123 registers the conditions and actions analyzed by the designated condition analyzing unit 122 as a callback process corresponding to each operation of the user.

More specifically, the designated condition registering unit 123 registers an action corresponding to each of the operations of the user on the basis of the analysis result obtained by the designated condition analyzing unit 122. In the example illustrated in FIG. 1, as the result of the analysis performed by the designated condition analyzing unit 122, data related to actions upon change in tool length compensation amount, data related to actions upon change in work offset, data related to actions upon execution of simulation, and data related to actions upon execution of cycle start are stored in the designated condition registering unit 123. However, there is no limitation thereto.

The operation receiving unit 131 receives execution of an operation by the user on the controller 1.

In the example illustrated in FIG. 1, execution of operations of the user such as a tool length compensation amount changing operation, a work offset changing operation, a simulation execution operation, and a cycle start execution operation is received. However, there is no limitation thereto.

The operation receiving unit 131 may be separated from the controller 1.

The designated condition execution unit 132 issues an event when an operation of the user is executed and executes a callback process corresponding to the operation of the user. In the example illustrated in FIG. 1, the designated condition registering unit 123 inputs the data related to actions upon change in tool length compensation amount to a callback I/F upon change in tool length compensation amount, of the designated condition execution unit 132.

The designated condition execution unit 132 executes an action upon change in tool length compensation amount as a callback process by referring to the data input to the callback I/F upon change in tool length compensation amount.

Similarly, the designated condition registering unit 123 inputs the data related to actions upon change in work offset to a callback I/F upon change in work offset, of the designated condition execution unit 132.

The designated condition execution unit 132 executes an action upon change in work offset as a callback process by referring to the data input to the callback I/F upon change in work offset.

Moreover, the designated condition registering unit 123 inputs the data related to actions upon execution of simulation to a callback I/F upon execution of simulation, of the designated condition execution unit 132.

The designated condition execution unit 132 executes an action upon execution of simulation as a callback process by referring to the data input to the callback I/F upon execution of simulation.

Furthermore, the designated condition registering unit 123 inputs the data related to actions upon execution of cycle start to a callback I/F upon execution of cycle start, of the designated condition execution unit 132.

The designated condition execution unit 132 executes an action upon execution of cycle start by referring to the data input to the callback I/F upon execution of cycle start.

These callback processes are examples only and are not limited thereto.

For example, rather than executing the callback process in response to execution of a certain operation by the user, the designated condition execution unit 132 may execute the callback process when the user does not execute a certain operation for a certain period in addition to executing the callback process in response to execution of a certain operation by the user.

Figure 3:
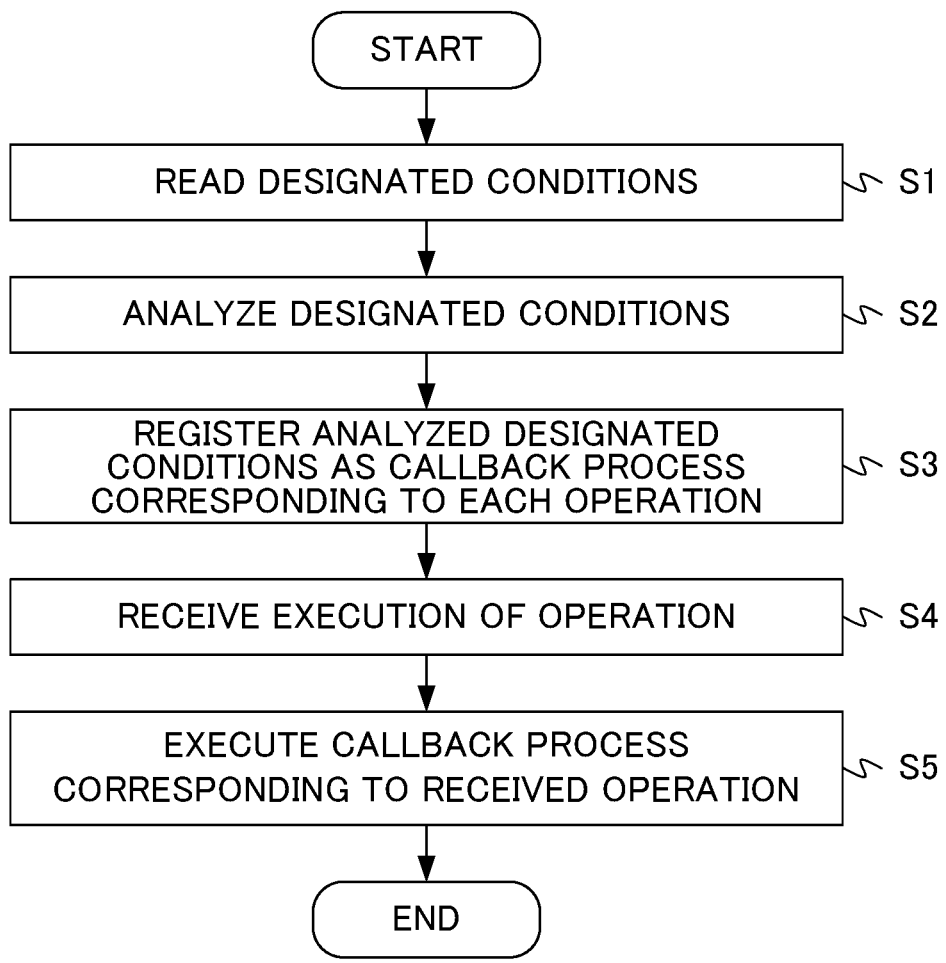
FIG. 3 is a flowchart illustrating an action of the controller according to the first embodiment of the present invention.

FIG. 3 is a flowchart illustrating an action of the callback process executed by the controller 1.

In step S1, the designated condition reading unit 121 receives conditions and actions (designated conditions) received by the receiving unit 11 from the user.

In step S2, the designated condition analyzing unit 122 analyzes the conditions and actions (designated conditions) read by the designated condition reading unit 121.

In step S3, the designated condition registering unit 123 registers the conditions and actions (designated conditions) analyzed by the designated condition analyzing unit 122 as a callback process corresponding to each operation.

In step S4, the operation receiving unit 131 receives execution of the operation by the user.

In step S5, the designated condition execution unit 132 executes the callback process corresponding to the operation received by the operation receiving unit 131.

Advantages of First Embodiment

In the first embodiment, the controller 1 includes the receiving unit 11 that receives conditions and actions of a callback process associated with control of an industrial machine, and the designated condition registering unit 123 that registers the conditions and actions received by the receiving unit 11 as a callback process.

In this way, a user can customize the content of a callback process and can prevent human mistakes by automatically performing appropriate checking operations.

Second Embodiment

Hereinafter, a second embodiment of the present invention will be described in detail with reference to FIGS. 4 and 5. The second embodiment is a control system that sets and executes a callback process via a network, unlike the first embodiment.

Figure 4:
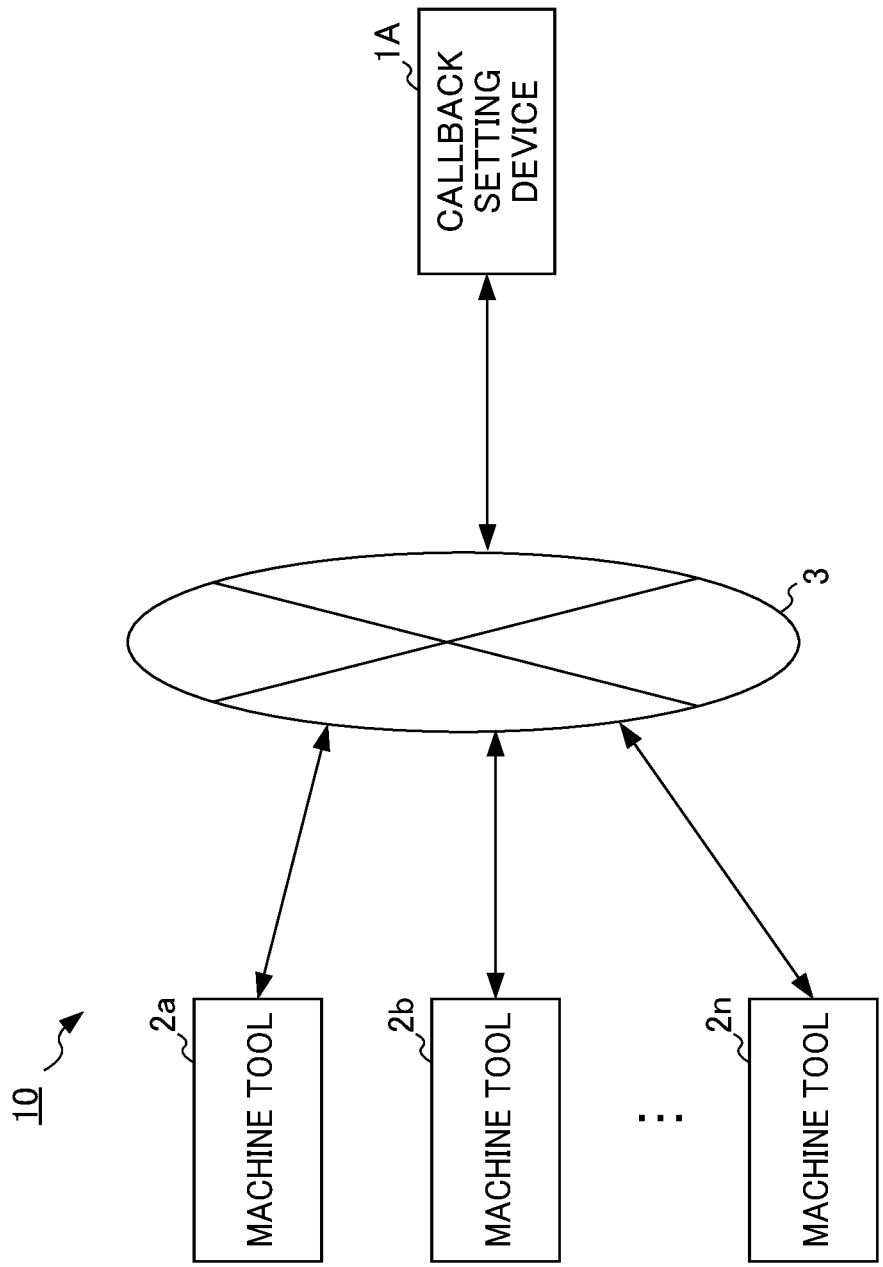
FIG. 4 is a diagram illustrating an overall configuration of a control system according to a second embodiment of the present invention.

FIG. 4 is a diagram illustrating an overall configuration of a control system 10 according to the second embodiment. The control system 10 includes a callback setting device 1A, one or more machine tools 2, and a network 3 that communicably connects the callback setting device 1A and the one or more machine tools 2.

The callback setting device 1A corresponds to a portion of the controller 1 of the first embodiment and is a device for allowing a user to set the content of a callback process.

The machine tool 2 is a device that performs predetermined machining such as cutting and includes a motor driven to machine a work, a spindle and a feed axis attached to the motor, and a jig and a tool corresponding to these respective axes.

The machine tool performs predetermined machining by driving the motor on the basis of a motion command.

Here, there is no particular limitation to the content of the predetermined machining, and the machining may be grinding, sanding, rolling, or forging other than the cutting, for example.

The network 3 is realized by a local area network (LAN) constructed in a factory or a virtual private network (VPN) constructed on the Internet.

Figure 5:
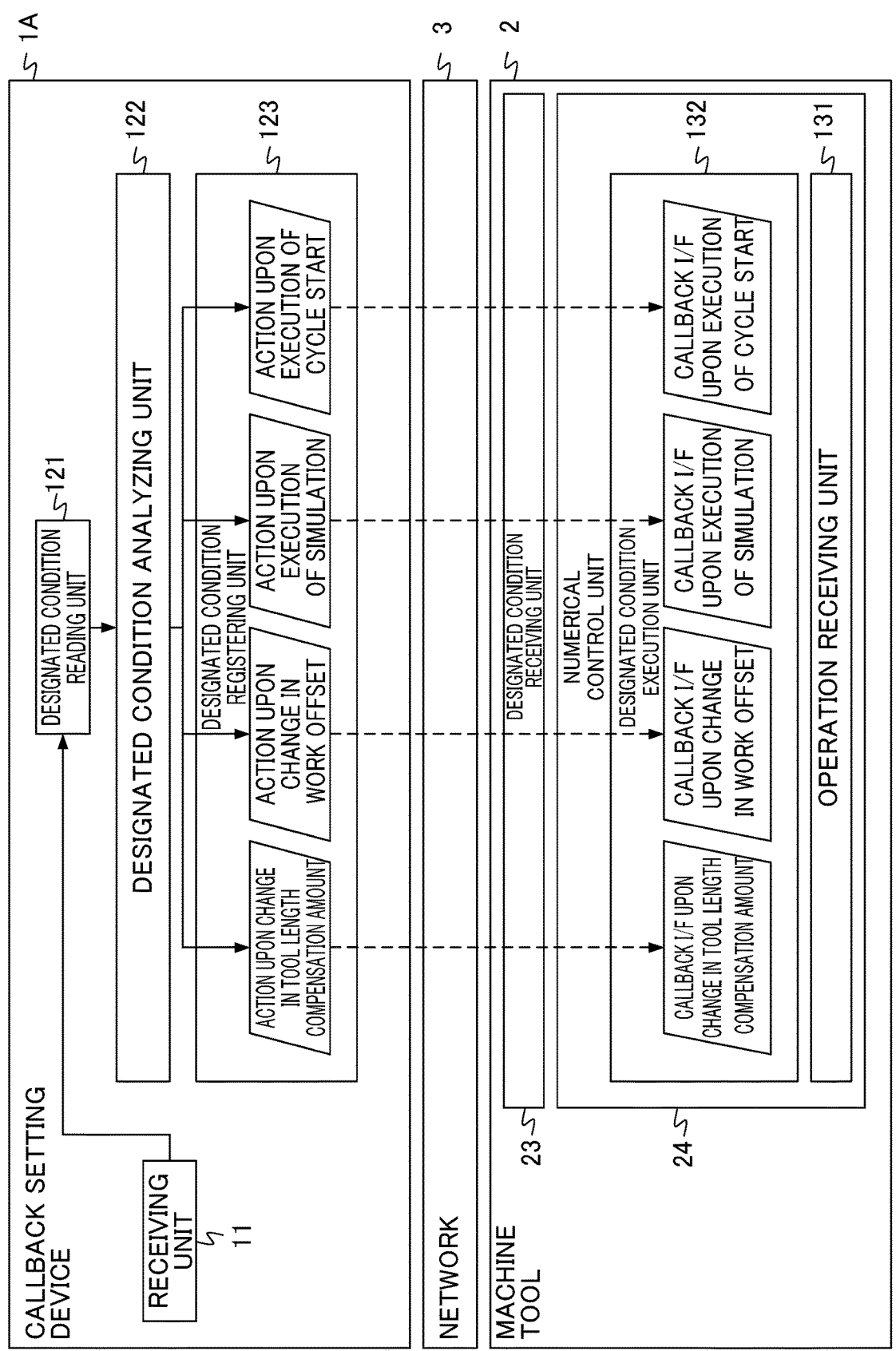
FIG. 5 is a functional block diagram of a machine tool and the controller according to the second embodiment of the present invention.

FIG. 5 illustrates an example of a functional block diagram of the control system 10.

The same functional blocks as those of the controller 1 according to the first embodiment will be denoted by the same reference numerals, and the description of the functions will be omitted.

The callback setting device 1A includes a receiving unit 11, a designated condition reading unit 121, a designated condition analyzing unit 122, and a designated condition registering unit 123.

The machine tool 2 includes a designated condition receiving unit 23 and a numerical control unit 24.

The designated condition receiving unit 23 receives data related to the content of a callback process registered by the callback setting device 1A.

More specifically, the designated condition receiving unit 23 receives, via the network 3, data related to actions upon change in tool length compensation amount, data related to actions upon change in work offset, data related to actions upon execution of simulation, and data related to actions upon execution of cycle start, which are stored in the designated condition registering unit 123 of the callback setting device 1A. However, the data stored in the designated condition registering unit 123 is not limited thereto.

The designated condition receiving unit 23 can receive data related to actions of the callback process with respect to an arbitrary operation of the user.

The numerical control unit 24 executes a program for numerically controlling the machine tool 2 as one of its functions.

Furthermore, the numerical control unit 24 includes an operation receiving unit 131 and a designated condition execution unit 132 separately from the function of executing the program for numerical control.

The designated condition receiving unit 23 inputs the received data related to actions upon change in tool length compensation amount to a callback I/F upon change in tool length compensation amount, of the designated condition execution unit 132.

The designated condition execution unit 132 executes an action upon change in tool length compensation amount as a callback process by referring to the data input to the callback I/F upon change in tool length compensation amount.

Similarly, the designated condition receiving unit 23 inputs the received data related to actions upon change in work offset to a callback I/F upon change in work offset, of the designated condition execution unit 132.

The designated condition execution unit 132 executes an action upon change in work offset as a callback process by referring to the data input to the callback I/F upon change in work offset.

Moreover, the designated condition receiving unit 23 inputs the received data related to actions upon execution of simulation to a callback I/F upon execution of simulation, of the designated condition execution unit 132.

The designated condition execution unit 132 executes an action upon execution of simulation as a callback process by referring to the data input to the callback I/F upon execution of simulation.

Furthermore, the designated condition receiving unit 23 inputs the received data related to actions upon execution of cycle start to a callback I/F upon execution of cycle start, of the designated condition execution unit 132.

The designated condition execution unit 132 executes an action upon execution of cycle start by referring to the data input to the callback I/F upon execution of cycle start.

These callback processes are examples only and are not limited thereto.

For example, rather than executing the callback process in response to execution of a certain operation by the user, the designated condition execution unit 132 may execute the callback process when the user does not execute a certain operation for a certain period in addition to executing the callback process in response to execution of a certain operation by the user.

Advantages of Second Embodiment

In the second embodiment, similarly to the first embodiment, a user can customize the content of a callback process and can prevent human mistakes by automatically performing appropriate checking operations.
When the functions of the controller 1 according to the first embodiment are distributed over a network, edge computing or fog computing can be enabled and hence high-speed processing can be realized.
When a checking function of the same specifications is set to all machine tools or numerical controllers connected to a network present in a factory, the function can be set collectively by a single callback setting device.
[Modification 1]
In the first and second embodiments, the user inputs the designated conditions by describing a script in the receiving unit 11. However, there is no limitation thereto.
For example, as described above, the user may input the designated conditions by operating via a GUI.
[Modification 2]
In the second embodiment, the numerical control unit 24 is one component of the machine tool 2. However, there is no limitation thereto.
For example, the numerical control unit 24 may be a numerical controller separated from the machine tool 2.
In this case, the control system 10 may include a robot instead of the machine tool 2 and a robot controller instead of the numerical controller.
[Modification 3]
In the second embodiment, the receiving unit 11 is included in the callback setting device 1A. However, there is no limitation thereto.
For example, the receiving unit 11 may be included in the machine tool 2 (particularly, the numerical control unit 24 of the machine tool 2), conditions and actions corresponding to the conditions may be input from the receiving unit 11 of the machine tool 2, and the input conditions and actions may be transmitted to the designated condition reading unit 121 of the callback setting device 1A via the network 3.
[Modification 4]
In the second embodiment, the callback setting device 1 and the machine tool 2 are communicably connected via the network 3. However, there is no limitation thereto. For example, the callback setting device 1 and the machine tool 2 may be connected directly, and not via the network 3. In this case, the machine tool 2 does not include the designated condition receiving unit 23.
[Modification 5]
In the second embodiment, the designated condition receiving unit 23 may be separated from the machine tool 2. Furthermore, in the second embodiment, the designated condition receiving unit 23 may be included in the numerical control unit 24.
In the respective embodiments above, a method of setting the content of the callback process performed by the controller 1, the callback setting device 1A, and the control system 10 is realized by software.

When the method is realized by software, programs that form the software are installed in a computer (the controller 1 and the callback setting device 1A).
These programs may be recorded on a removable medium and be distributed to users and may be distributed by being downloaded to the computers of users via a network.

EXPLANATION OF REFERENCE NUMERALS

1: Controller
1A: Callback setting device
2: Machine tool
3: Network
10: Control system
11: Receiving unit
23: Designated condition receiving unit
24: Numerical control unit
121: Designated condition reading unit
122: Designated condition analyzing unit
123: Designated condition registering unit
131: Operation receiving unit
132: Designated condition execution unit

What is claimed is:

1. A callback processing device, comprising:
a controller configured to control an industrial machine performing an industrial machining operation; and
a non-transitory memory configured to store a program, which when executed by the controller causes the callback setting device to:
receive a condition of a callback process associated with control of the industrial machine and an action corresponding to the condition;
read the condition and the action;
generate a syntax tree from a script including the condition and action read, and extract the condition and the action from the syntax tree generated;
register the condition and the action extracted as a callback process;
receive input data to a callback I/F for executing the registered action;
determine whether to execute the action or modify the action as the callback process by referring to the input data to the callback I/F; and
execute the callback process based on the data input to the callback I/F.

2. The callback processing device according to claim 1, wherein
the condition includes any one or more among identifiers corresponding to various operations of a user in the industrial machine, a machine coordinate value, a tool length compensation amount, a tool wear compensation amount, a work coordinate system offset, a workpiece setting error compensation amount, input signals from a control board for operating the industrial machine, input signals from sensors attached to the industrial machine, operation information of an MDI key or a soft key of the industrial machine, transmission/reception information of communication signals, parameters, macro variables, and system variables used for controlling the industrial machine, and diagnosis information of the industrial machine.

3. The callback processing device according to claim 1, wherein
the action includes one or more among permission of execution of an operation from a user, rejection of execution of an operation from a user, application of changes in setting values of the controller, cancellation of changes in setting values of the controller, displaying of messages, issuing of alarms, transmission/reception of control signals, and transmission/reception of communication signals.

4. The callback processing device according to claim 1, further comprising:
a designated condition execution unit that executes the callback process corresponding to the operation.

5. A control system comprising:
a callback processing device; and
one or more industrial machines communicably connected to the callback processing device via a network,
the callback processing device includes:
a callback controller configured to control the one or more industrial machines performing industrial machining operations, and
a first non-transitory memory configured to store a program, which when executed by the callback controller causes the callback setting device to:
receive a condition of a callback process associated with control of the one or more industrial machines and an action corresponding to the condition,
read condition and the action;
generate a syntax tree from a script including the condition and action read, and extract the condition and the action from the syntax tree generated;
register the condition and the action extracted as a callback process; and
receive input data to a callback I/F for executing the registered action,
each industrial machine is configured to:
receive a content of the callback process registered by the callback processing device;
include a numerical controller; and
a second non-transitory memory configured to store program, which when executed by the numerical controller causes the industrial machine to:
receive an operation by a user on the industrial machine,
determine whether to execute the action or modify the action as the callback process corresponding to the operation by referring to the input data to the callback I/F, and
execute the callback process corresponding to the operation based on the data input to the callback I/F.

6. The control system according to claim 5, wherein
the numerical controller is separated from the industrial machine.

7. The control system according to claim 5, wherein
the callback processing device is separated from the industrial machine.

8. A control system comprising:
a callback processing device; and
one or more industrial machines communicably connected directly to the callback setting device,
the callback processing device includes:
a callback controller configured to control the one or more industrial machines performing industrial machining operations, and
a first non-transitory memory configured to store a program, which when executed by the callback controller causes the callback setting device to:
receive a condition of a callback process associated with control of the one or more industrial machines and an action corresponding to the condition,
register the condition and the action received as a callback process,
receive input data to a callback I/F for executing the registered action; and
each industrial machine includes:
a numerical controller, and
a second non-transitory memory configured to store a memory, which when executed by the numerical controller causes the industrial machine to:
receive execution of an operation by a user on the industrial machines,
determine whether to execute the action or modify the action as the callback process corresponding to the operation by referring to the input data to the callback I/F, and
execute the action as the callback process corresponding to the operation based on the data input to the callback I/F,
wherein the numerical controller is separated from the industrial machine.

* * * * *